(12) United States Patent
Koiwai et al.

(10) Patent No.: US 8,014,048 B2
(45) Date of Patent: Sep. 6, 2011

(54) IMAGE FORMING DEVICE (75) Inventors: Hideo Koiwai, Saitama (JP); Kazuhiro Gotoh, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1077 days.

(21) Appl. No.: 11/781,864

(22) Filed: Jul. 23, 2007

(65) Prior Publication Data
US 2008/0106774 A1 May 8, 2008

(30) Foreign Application Priority Data

Nov. 7, 2006 (JP) ................. 2006-301612

(51) Int. Cl.
*H04N 1/04* (2006.01)
*G03G 15/00* (2006.01)
*E04G 3/00* (2006.01)

(52) U.S. Cl. .................. 358/498; 399/380; 248/292.12
(58) Field of Classification Search .................. 358/498; 399/380; 248/292.12; 280/43.21; 194/223, 194/226
See application file for complete search history.

(56) References Cited

U.S. PATENT DOCUMENTS
2004/0094141 A1 * 5/2004 Herring ........................ 126/25 R
2006/0202440 A1 * 9/2006 Pascznk .................... 280/47.371

FOREIGN PATENT DOCUMENTS
JP          59052224 A  *  3/1984
JP          01029829 A  *  1/1989
JP        2002002970 A  *  1/2002
JP        2002071265 A  *  3/2002
JP        2003-110768 A    4/2003

* cited by examiner

Primary Examiner — Twyler L Haskins
Assistant Examiner — Fan Zhang
(74) Attorney, Agent, or Firm — Sughrue Mion, PLLC (57) ABSTRACT

An image forming device including: a platen glass on which a document is placed; a platen cover that presses and retains the document placed on the platen glass; an engagement portion provided at a side surface of the platen cover; a link component attached to a side surface of the device main body to be movable in a substantially vertical direction; a groove portion provided at an upper end portion of the link component, that engages with the engagement portion when the link component is moved substantially upward from a housed position thereof, whereby the platen cover opens or closes due to movement of the link component, and that does not engage with the engagement portion when the link component is at the housed position; and an operating portion provided to be positioned beneath the platen cover, for moving the link component in the substantially vertical direction, is provided.

7 Claims, 11 Drawing Sheets

IMAGE FORMING DEVICE

CROSS-REFERENCE TO RELATED APPLICATION

This application is based on and claims priority under 35 USC 119 from Japanese Patent Application No. 2006-301612 filed Nov. 7, 2006.

BACKGROUND

1. Technical Field

The present invention relates to an image forming device that forms an image on a sheet material.

2. Related Art

Image forming devices are provided with a platen cover that covers a platen glass on which a document is placed. In order to be able to open the platen cover towards the rear direction, a grip is provided on the front surface of the platen cover.

If, however, a user utilizing a wheelchair approaches the image forming device from the front and tries to grasp this grip to open the platen cover, the grip moves further away from the user towards the rear (i.e., in the direction opposite that of the user) the more the platen cover opens. For this reason, a user seated in a wheelchair cannot open the platen cover to the degree of opening necessary for that the platen cover does not interrupt being a document placed on the platen glass when placing the document on the platen glass.

SUMMARY

An image forming device according to an aspect of the present invention includes: a platen glass on which a document is placed; a platen cover that presses and retains the document placed on the platen glass; an engagement portion provided at a side surface of the platen cover; a link component attached to a side surface of a device main body of the image forming device so as to be movable in a substantially vertical direction; a groove portion provided at an upper end portion of the link component, that engages with the engagement portion when the link component is moved substantially upward from a housed position thereof, whereby the platen cover opens or closes due to movement of the link component, and that does not engage with the engagement portion when the link component is at the housed position; and an operating portion provided so as to be positioned beneath the platen cover, that is for moving the link component in the substantially vertical direction.

BRIEF DESCRIPTION OF THE DRAWINGS

Exemplary embodiments of the present invention will be described in detail with reference to the following figures, wherein.

DETAILED DESCRIPTION

The first exemplary embodiment of the image forming device 10 according to the present invention will be explained while referring to FIGS. 1A-5.

Figure 5:
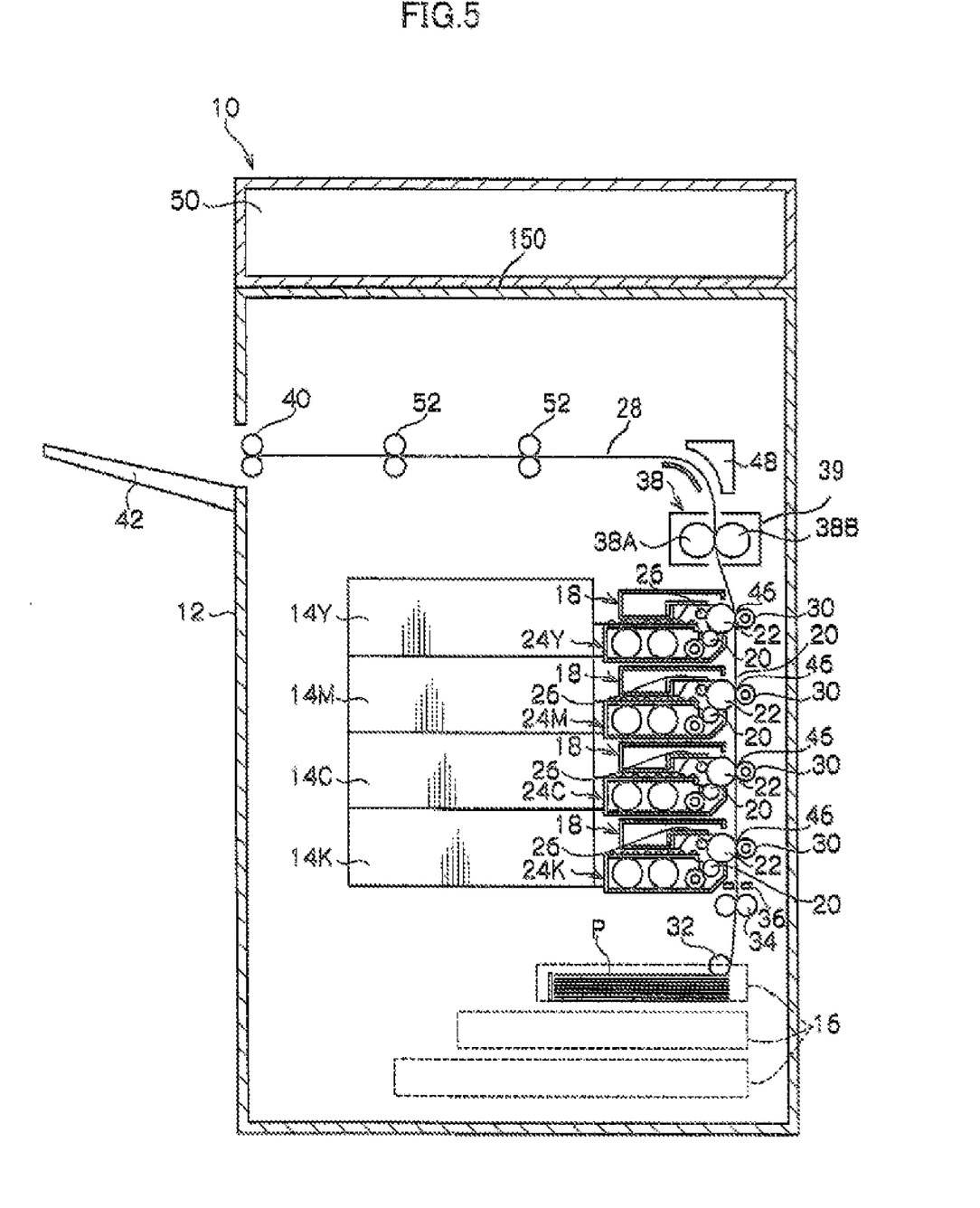
FIG. 5 is a general configuration drawing of the image forming device according to the first exemplary embodiment of the present invention.

As shown in FIG. 5, an image forming device 10 is provided with a device main body 12 that performs image formation on a sheet material P. Inside the device main body 12, the following are arranged in this order from the top in the vertical direction: a developer 24Y that forms yellow toner images; a developer 24M that forms magenta toner images; a developer 24C that forms cyan toner images; and a developer 24K that forms black toner images. Note that when it is necessary to distinguish between the Y, M, C, K, one of Y, M, C, or K will be attached to the reference numeral and it will be explained, and when it is not necessary to distinguish these, Y, M, C, or K will not attached to the reference numeral.

A photosensitive cartridge 18 arranged above the developer 24 is provided with a drum-shaped photosensitive body 22 and a charging roller 26 that charges the surface of this photosensitive body 22. Further, a light scanning device 14 corresponding to each color is arranged adjacent to the photosensitive cartridge 18. The light scanning device 14 exposes the surface of the photosensitive body 22 to form an electrostatic latent image.

Also, developing rollers 20 that are provided with the developers 24Y, 24M, 24C, and 24K develop the electrostatic latent images of the photosensitive bodies 22 with each of yellow (Y), magenta (M), cyan (C), and black (K).

Further, a transfer roller 30 that transfers the toner image of the photosensitive body 22 to the sheet material P is arranged to face each photosensitive body 22 thus forming an image forming unit 46.

A paper supply cassette 16 that houses the sheet material P is provided in the device main body 12 at the lower portion thereof. A feed roller 32 that feeds out the sheet material P at preset timing is provided at the paper supply cassette 16. Nip conveying rollers 34 are provided at a conveying path 28 of the sheet material P positioned between the feed roller 32 and the developer 24K, and an optical sheet material passage sensor 36 is arranged at the downstream side of the nip conveying rollers 34.

These sheet material passage sensor 36 detects the leading edge of the sheet material P, and the writing timing (the forming timing) of the electrostatic latent image by each of the light scanning devices 14 is controlled based on the timing of this detection. Further, a fixing device 38 that fixes toner images to the sheet material P by heating and pressing is provided at the conveying path 28 that is positioned at the downstream side of the developer 24Y. A fixing roller 38A which includes a heater built in and a pressing roller 38B are provided in the interior of a casing 39 of this fixing device 38.

The following are provided at the downstream side of the fixing device 38: a guiding component 48 that guides the sheet material P on which the toner image is fixed; and plural conveying rollers 52 and discharging rollers 40 that guide the sheet material P which is guided by the guiding component 48 to a discharge tray 42 provided at the side surface of the device main body 12.

An image reading unit that reads the image information of a document sheet material P is also provided at the upper portion of the device main body 12. A platen cover 50 is opened, a document sheet material P is placed on a platen glass 150, then the platen cover 50 is closed and the placed document sheet material P is pressed, whereby the image information of the document sheet material P can be read. Note that the way of opening and closing the platen cover 50 will be described in detail later.

With the image forming device 10 configured as described above, images are formed in the following manner.

First, as shown in FIG. 5, the charging roller 26 to which voltage has been applied evenly charges the surface of the photosensitive body 22 negatively at a predetermined charging electrical potential.

Next, an image reading device (not shown in the drawings) reads the image information of the document sheet material P placed on the platen glass 150, and the light scanning device 14 exposes the charged photosensitive body 22 based on this image information. An electrostatic latent image is then formed on the photosensitive body 22.

That is, based on the image information from the image reading device, an electrostatic latent image that corresponds to the image information is formed on the photosensitive body 22 by turning the lasers outputted from the light scanning device 14 on or off.

Also, the electrostatic latent image on the photosensitive body 22 is developed with toner accommodated in the developer 24 when the electrostatic latent image passes through the developing roller 20, and is thus made visible as a toner image.

Here, the sheet material P accommodated in the paper supply cassette 16 and fed out by the feed roller 32 passes the image forming unit 46 between the photosensitive body 22 and the transfer roller 30, and the toner image is transferred to the sheet material P. This transferred toner image is heated and pressed by being nipped and conveyed between the fixing roller 38A and pressing roller 38B provided in the fixing device 38, and is thus fixed to the sheet material P.

Also, the sheet material P to which the toner image is fixed is guided by the guiding component 48 and discharged by the discharging rollers 40 to the discharge tray 42 provided on the side surface of the device main body 12.

Next, the way of opening and closing of the platen cover 50 will be explained in detail.

Figure 4:
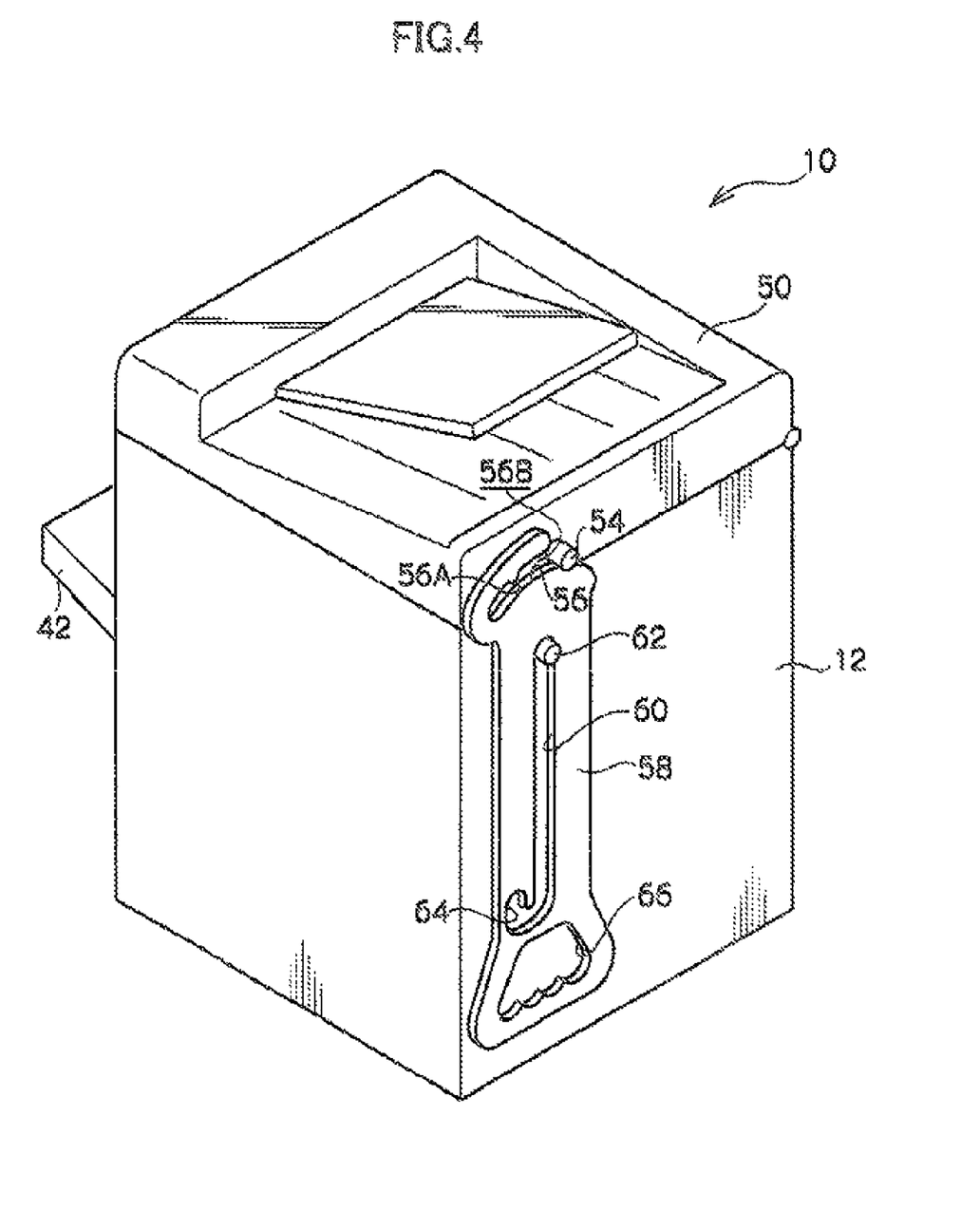
FIG. 4 is a perspective drawing of the image forming device according to the first exemplary embodiment of the present invention.

As shown in FIG. 4, a cylindrical member 54 is provided as an engagement portion on the side surface (i.e., on the side surface with respect to the opening and closing direction of the platen cover 50) of the platen cover 50 at the free end side. A plate shaped link component 58 is also provided at the side surface of the device main body 12. In the top end of the link component 58, a U-groove 56 is formed that latches (engages) with the cylindrical member 54 when an operation, which will be explained later, is performed.

More specifically, the U-groove 56 has a substantially arc shape which extends toward the front and rear of the substantially opening and closing direction of the platen cover 50 and has an open portion 56B that opens towards the rear. A slide groove 60 that extends in the up and down directions is provided at the link component 58 under the U-groove 56. The slide groove 60 is fit onto a cylindrical pin 62 provided on the device main body 12, and the configuration is such that the link component 58 is operated by making this slide groove 60 move along the pin 62.

A J-shaped lock groove 64 is provided as a lock portion to communicate (connect) with the slide groove 60 at the bottom end of the slide groove 60. This is such that the link component 58 is retained at a time in which the platen cover 50 is at the open position thereof (which will be described later) by making the pin 62 latch in the lock groove 64.

Further, a grip 66 that acts as an operating portion for operating the link component 58 opens underneath the lock groove 64. The user can grasp this grip 66 and operate the link component 58.

Figure 1A:
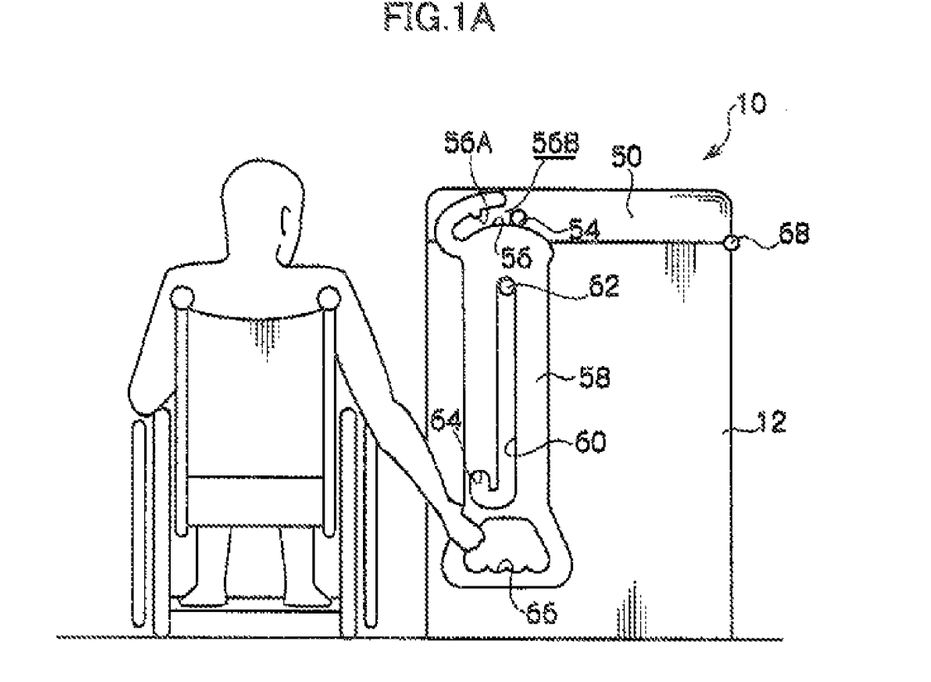
FIG. 1A is a side view showing an image forming device according to a first exemplary embodiment of the present invention in a state where the platen cover is closed and the link component is stowed.
Figure 1B:
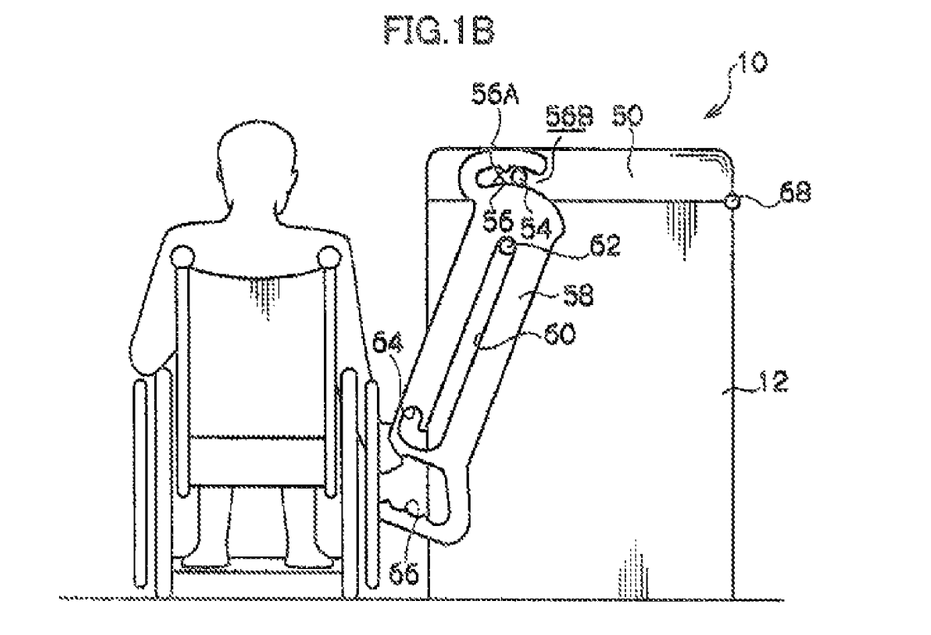
FIG. 1B is a side view showing the image forming device according to the first exemplary embodiment of the present invention in a state where the platen cover is closed and the user is beginning to operate the link component.

Due to this configuration, when a user in a wheelchair opens the platen cover 50, first, as shown in FIG. 1A, the user approaches from the side of the image forming device 10. The user extends his/her hand (arm) and grasps the grip 66 of the link component 58 that is in a housed position (an initial position). Next, as shown in FIG. 1B, the user pulls the grip 66 toward him/her and makes the link component 58 rotate around the pin 62 and the cylindrical member 54 latch with the U-groove 56. Note that when viewed from the side, the link component 58 that is in the housed position is arranged so as not to protrude to the front area of the image forming device 10 (i.e., the area where the user is working).

Figure 2A:
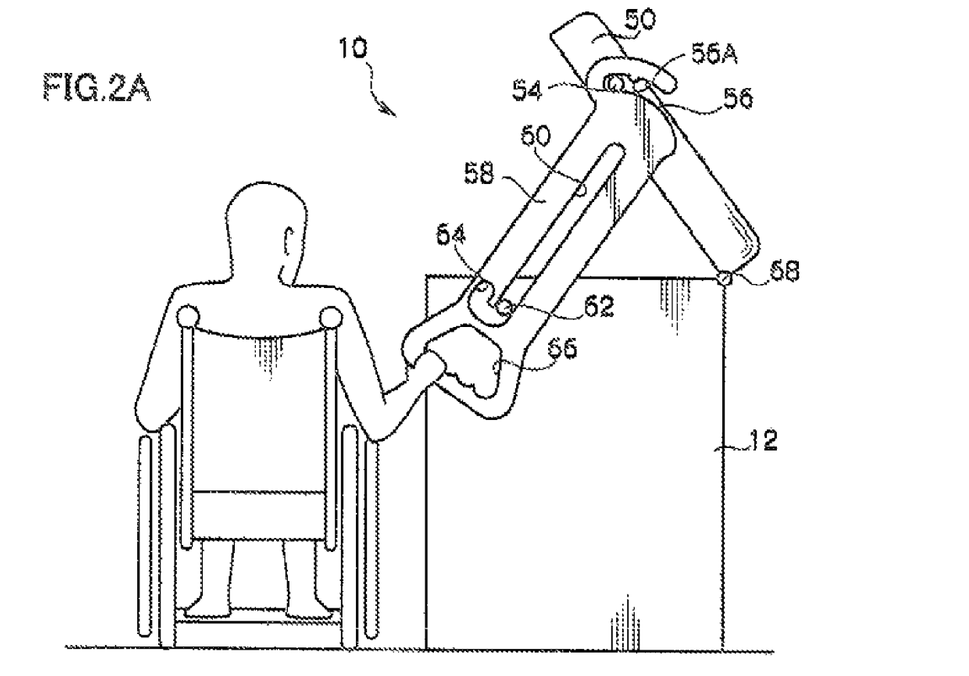
FIG. 2A is a side view showing the image forming device according to the first exemplary embodiment of the present invention in a state where the platen cover has been opened.
Figure 2B:
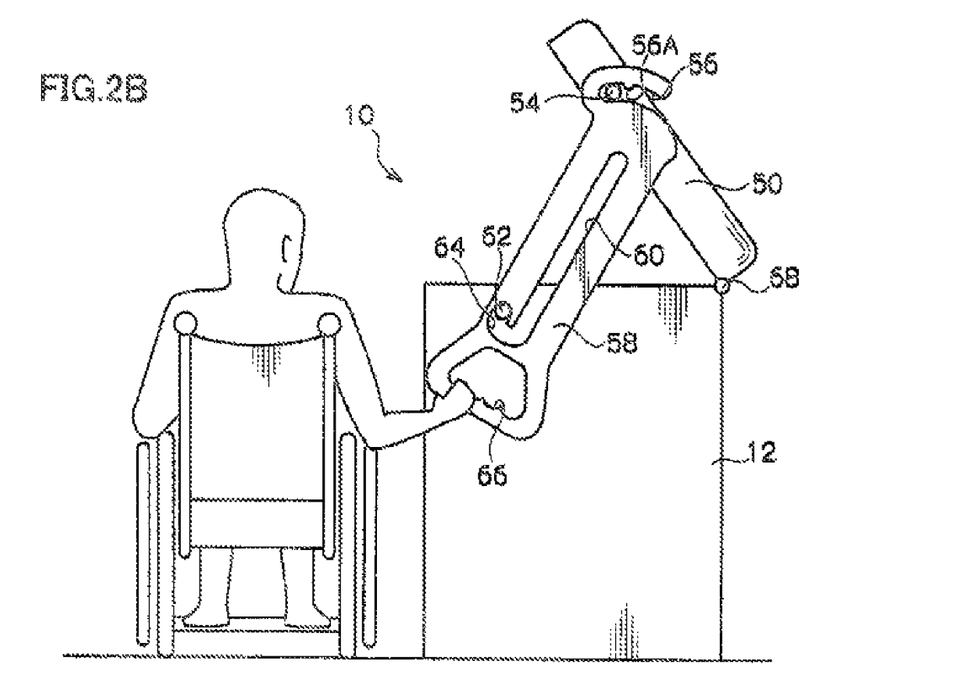
FIG. 2B is a side view showing the image forming device according to the first exemplary embodiment of the present invention in a state where the platen cover is open and the link component is locked.

Next, as shown in FIG. 2A, the user pushes the grip 66 slantingly upward and makes the slide groove 60 of the link component 58 slide along the pin 62. The user pushes the cylindrical member 54 that is latched with the U-groove 56 upward and thus opens the platen cover 50. Further, as shown in FIG. 2B, by making the pin 62 latch with the lock groove 64, the platen cover 50 is retained in an opened state.

Here, a half-circle protrusion 56A is provided in the U-groove 56. The cylindrical member 54 comes into contact with the protrusion 56A and the link component 58 is retained stably in this position.

Note that when closing the platen cover 50, the latching of the lock groove 64 and pin 62 is released and the slide groove 60 is made to slide along the pin 62, whereby by following a procedure that is opposite that for opening, the platen cover 50 can be closed. Here, by providing the rotation axis 68 of the platen cover 50 with a damper (not shown in the drawings), sudden closing of the platen cover 50 can be prevented.

Accordingly, the platen cover 50 can be opened up to a position where the space necessary for a user in a wheelchair to place a document on the platen glass can be obtained.

Further, by making the pin 62 latch with the lock groove 64, the user can remove his/her hand from the link component 58 and place a document sheet material P on the platen glass in a state where the platen cover 50 is open.

Also, the cylindrical member 54 that transmits force from the link component 58 is provided at the side surface of the platen cover 50. For this reason, the distance of the cylindrical member 54 from the rotation axis 68 of the platen cover 50 can be adjusted by adjusting the position in the forward and rear direction of the cylindrical member 54. Due to this, the amount of force of this operation necessary for the user can be reduced.

Figure 3A:
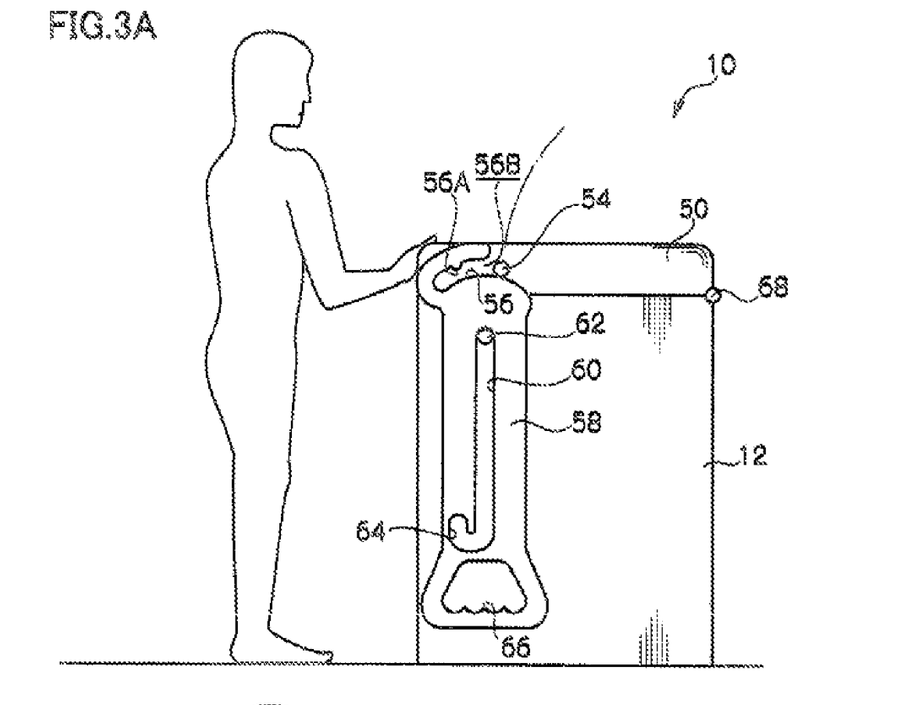
FIG. 3A is a side view showing the image forming device according to the first exemplary embodiment of the present invention in a state where the platen cover is closed.
Figure 3B:
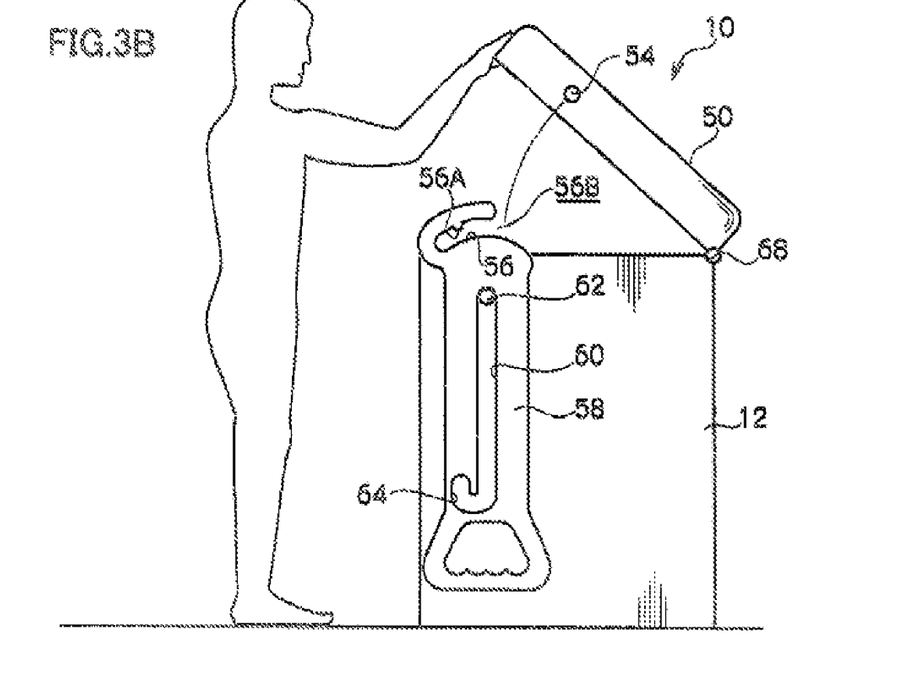
FIG. 3B is a side view showing the image forming device according to the first exemplary embodiment of the present invention in a state where the platen cover is opened by a physically unimpaired user.

When a physically unimpaired person opens the platen cover 50, first, as shown in FIG. 3A, the user approaches the image forming device 10 from the front. The user grasps the front end portion of the platen cover 50 and, as shown in FIG. 3B, extends his/her hand slantingly upward and opens the platen cover 50.

Here, the open portion 56B is formed at a rear portion of a groove wall of the U-groove 56 so as not to interfere with the cylindrical member 54. The configuration is such that the U-groove 56 and cylindrical member 54 do not latch at the housed position of the link component 58. For this reason, the link component 58 does not move even if the platen cover 50 is opened.

Accordingly, when a physically unimpaired person opens and closes the platen cover 50, the platen cover 50 can be opened and closed as is done conventionally, without the link component 58 preventing this opening and closing operation.

Also, when viewed from the side, the link component 58 that is in the housed position does not protrude to the front area of the image forming device 10 (i.e., the area where the user is working) so that the link component 58 is not an obstacle for the user. Further, by provided the link component 58 in the interior of the image forming device 10, the link component 58 can be configured so as not to protrude from the side of the image forming device 10.

Next, the second exemplary embodiment of the image forming device 10 of the present invention will be explained with FIG. 6.

Note that components that are the same as in the first exemplary embodiment will have the same reference numerals, and explanations thereof will be omitted.

Figure 6A:
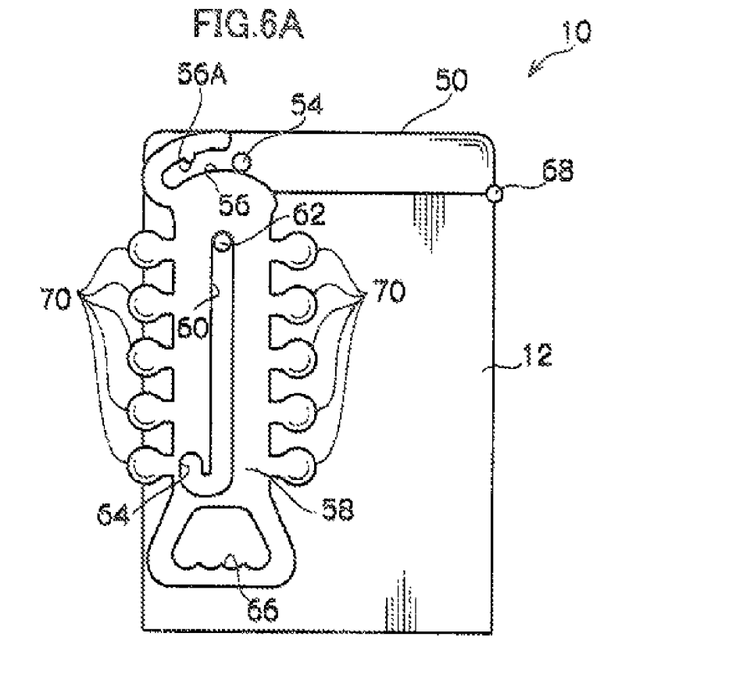
FIG. 6A is a side view showing an image forming device according to a second exemplary embodiment of the present invention in a state where the platen cover is closed and the link component is stowed.
Figure 6B:
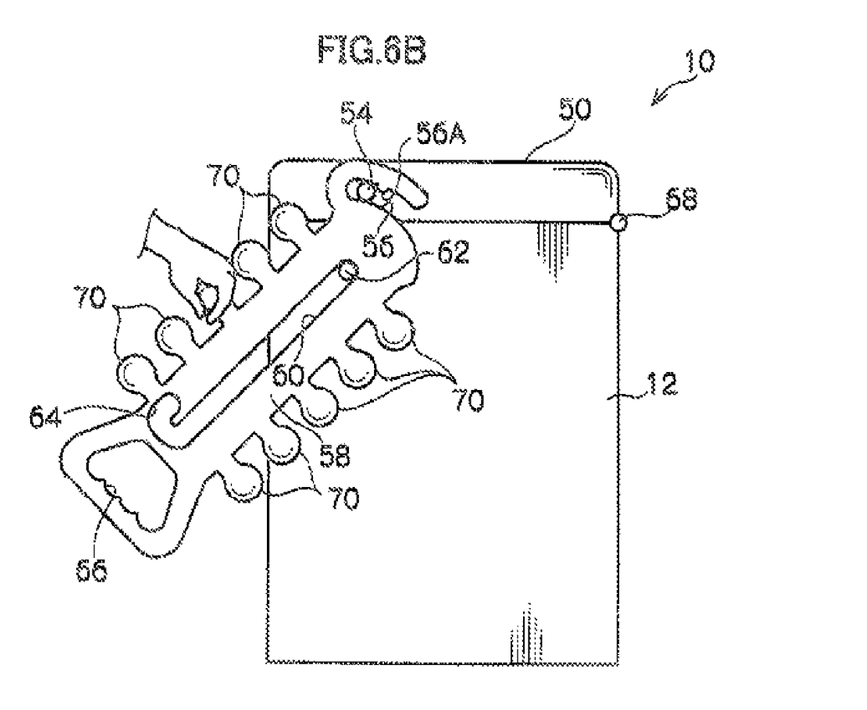
FIG. 6B is a side view showing the image forming device according to the second exemplary embodiment of the present invention in a state where the platen cover is closed and the user is beginning to operate the link component.

As shown in FIG. 6, this exemplary embodiment is different from the first embodiment in that plural grips 70 are provided along the longitudinal direction of the link component 58. For this reason, a user in a wheelchair can grasp the grip 70 that is easiest to reach and easily open and close the platen cover 50.

Next, the third exemplary embodiment of the image forming device 10 of the present invention will be explained with FIGS. 7-11.

Note that components that are the same as in the first exemplary embodiment will have the same reference numerals, and explanations thereof will be omitted.

Figure 11:
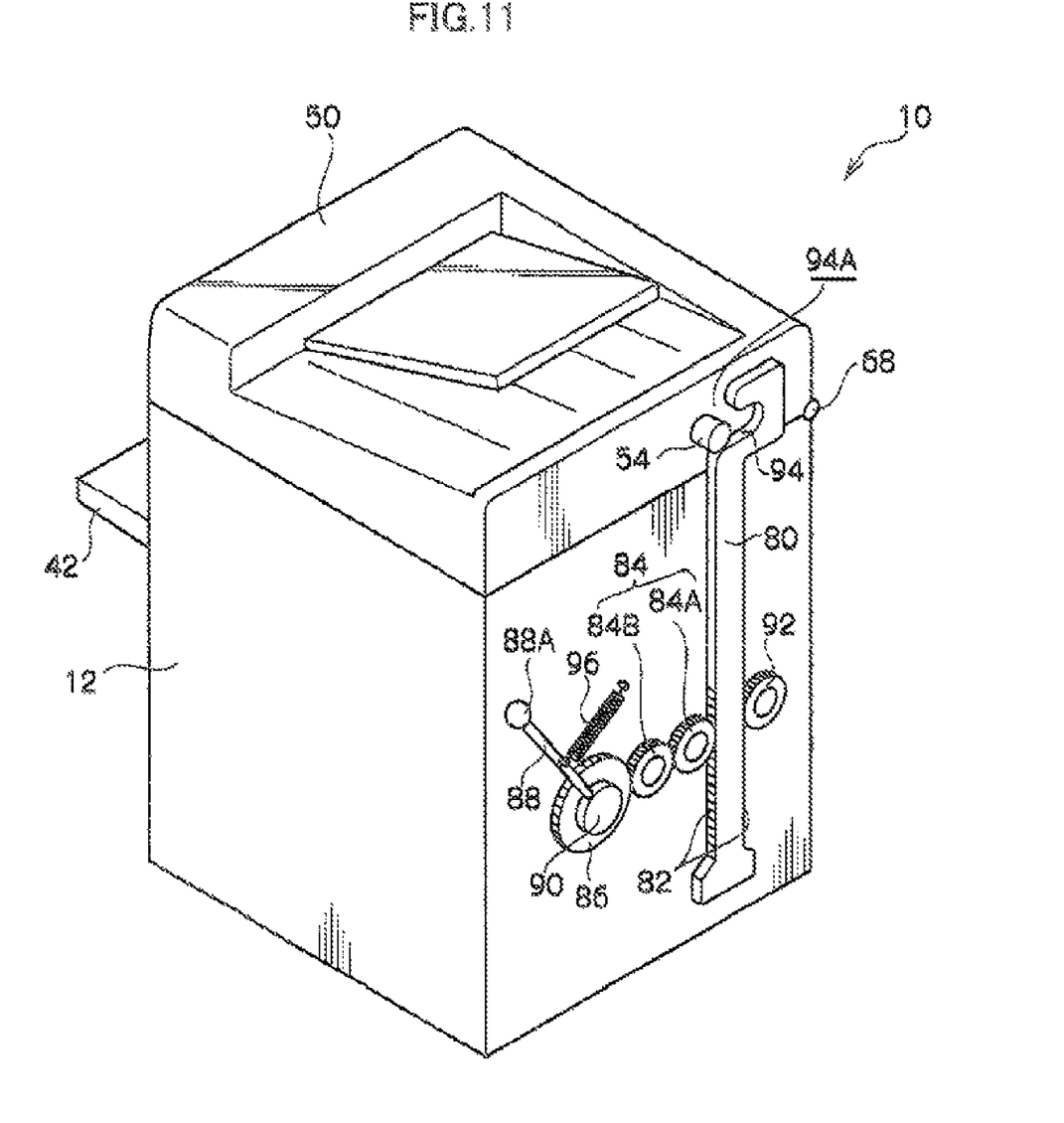
FIG. 11 is a perspective drawing of the image forming device according to the third exemplary embodiment of the present invention.

As shown in FIG. 11, this exemplary embodiment is different from the first embodiment in that there is a plate-shaped link component 80 provided with a U-shaped groove 94 that presses up the cylindrical member 54 provided at the side surface of the platen cover 50. Rack gears 82 (a front rack gear and a rear rack gear) that extend up and down direction are provided on this link component 80.

Figure 7:
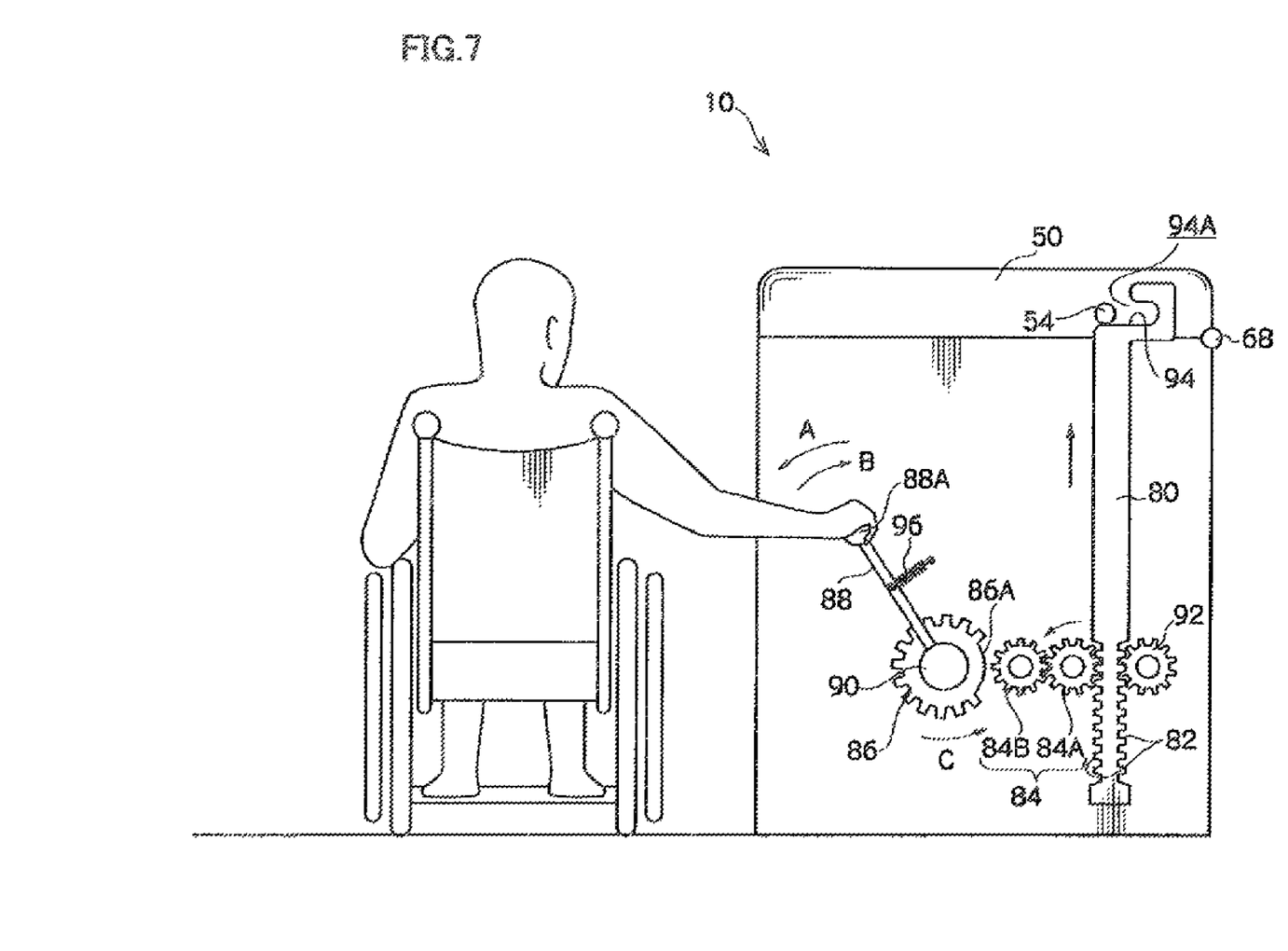
FIG. 7 is a side view showing an image forming device according to a third exemplary embodiment of the present invention in a state where the platen cover is closed and the link component is stowed.

More specifically, as shown in FIG. 7, the U groove 94 extends in the front and rear direction and has an opening 94A at the front portion. Under the U groove 94, the rack gears 82 (a front rack gear and a rear rack gear) that extend up and down direction are provided on the front and rear surfaces of the link component 80.

A gear group 84 is provided at the front side of the rack gears 82 so as to mesh with the rack gear 82 (the front rack gear) and be driven and rotated. The gear group 84 includes a first gear 84A that meshes with the rack gear 82 (the front rack gear) and a second gear 84B that meshes with the first gear 84A.

Also, a ratchet gear 86 is provided at a position that faces the second gear 84B. The ratchet gear 86 is provided with a toothless portion 86A that does not have gear teeth. The ratchet gear 86 rotates only in the direction for opening the platen cover 50.

Also, a rotational axis of a lever 88 provided with a knob 88A is provided at a rotational axis of the ratchet gear 86. Further, a one-way clutch 90 is provided between the lever 88 and the ratchet gear 86. The one-way clutch 90 only transmits rotational force in the direction for opening the platen cover 50 to the ratchet gear 86 from the lever 88.

Further, one end of a coil spring 96 is fixed to the central portion of the lever 88 and the coil spring 96 biases the lever 88 in one direction. The other end of the coil spring 96 is fixed to the device main body 12. Note that the rotational axis of the lever 88 is provided with a rotational stopper (not shown in the drawings). The lever 88 is retained at a preset position where the lever 88 is biased by the coil spring 96.

That is, when the user rotates the lever 88 back and forth in A and B directions shown in the drawing, this rotational force is transmitted to the ratchet gear 86 so as to only rotate in the C direction.

A damper gear 92 is provided at a position that is opposite the first gear 84A with respect to the rack gears 82. The damper gear 92 meshes with the rack gear 82 (the rear rack gear), and rotational resistance force is applied to the damper gear 92.

Due to this configuration, when a user in a wheelchair opens the platen cover 50, first, as shown in FIG. 7, the user approaches the image forming device 10 from the side and extends his/her hand, grasps the knob 88A of the lever 88 that is in a housed position (an initial position), and makes the lever 88 turn back and forth in the A and B directions.

Figure 8:
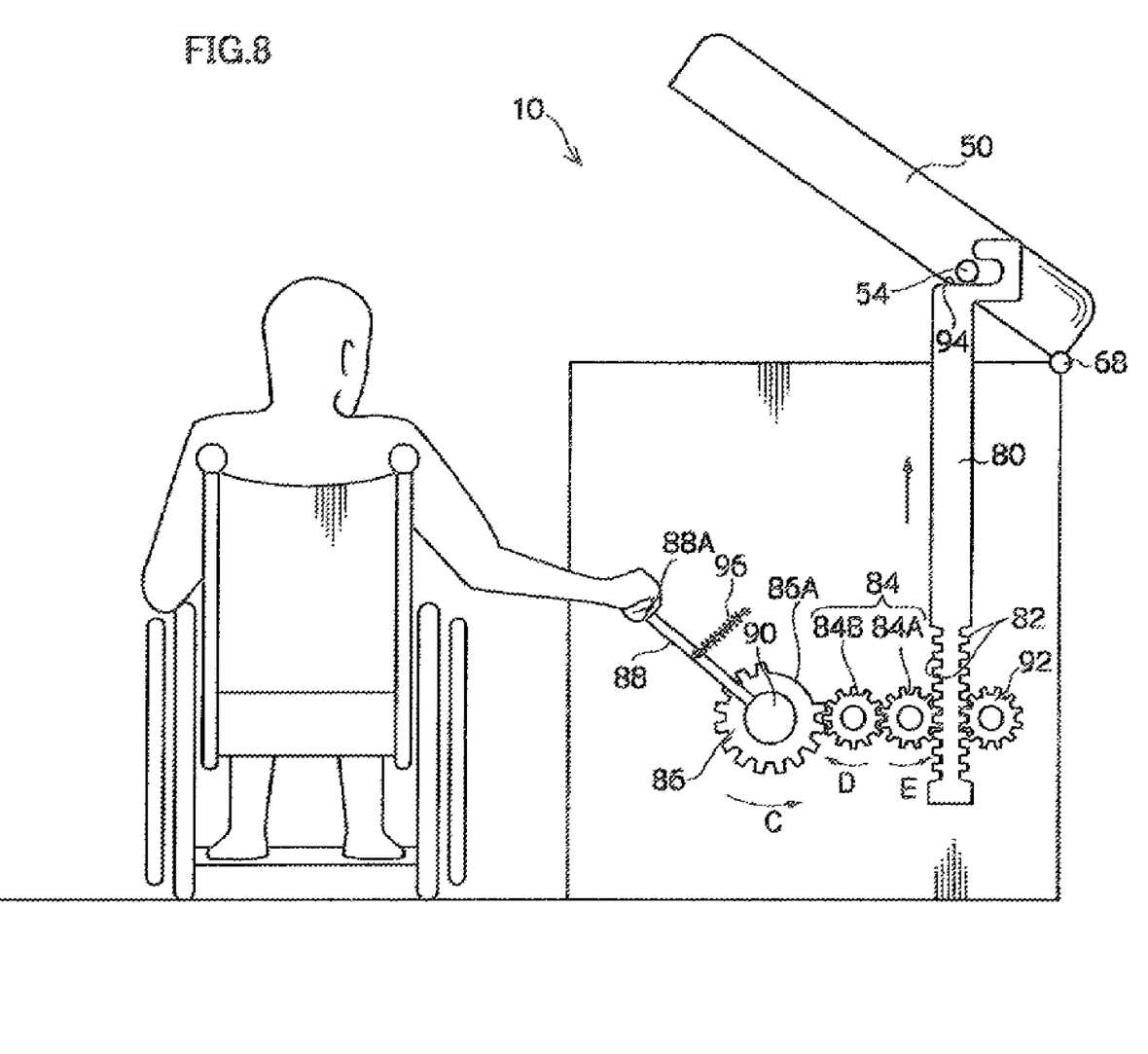
FIG. 8 is a side view showing the image forming device according to the third exemplary embodiment of the present invention in a state where the platen cover is beginning to be opened.

When the lever 88 is made to turn back and forth, as shown in FIG. 8, the ratchet gear 86 rotates in the direction of the arrow C and meshes with the second gear 84B, which rotates in the direction of the arrow D. Further, when the second gear 84B rotates in the direction of the arrow D, the first gear 84A that meshes with the second gear 84B rotates in the direction of the arrow E, and the rack gears 82 move upward.

The rack gears 82 move upward, whereby the cylindrical member 54 is pressed upward by the U groove 94 of the link component 80 and the platen cover 50 begins to open.

Figure 9:
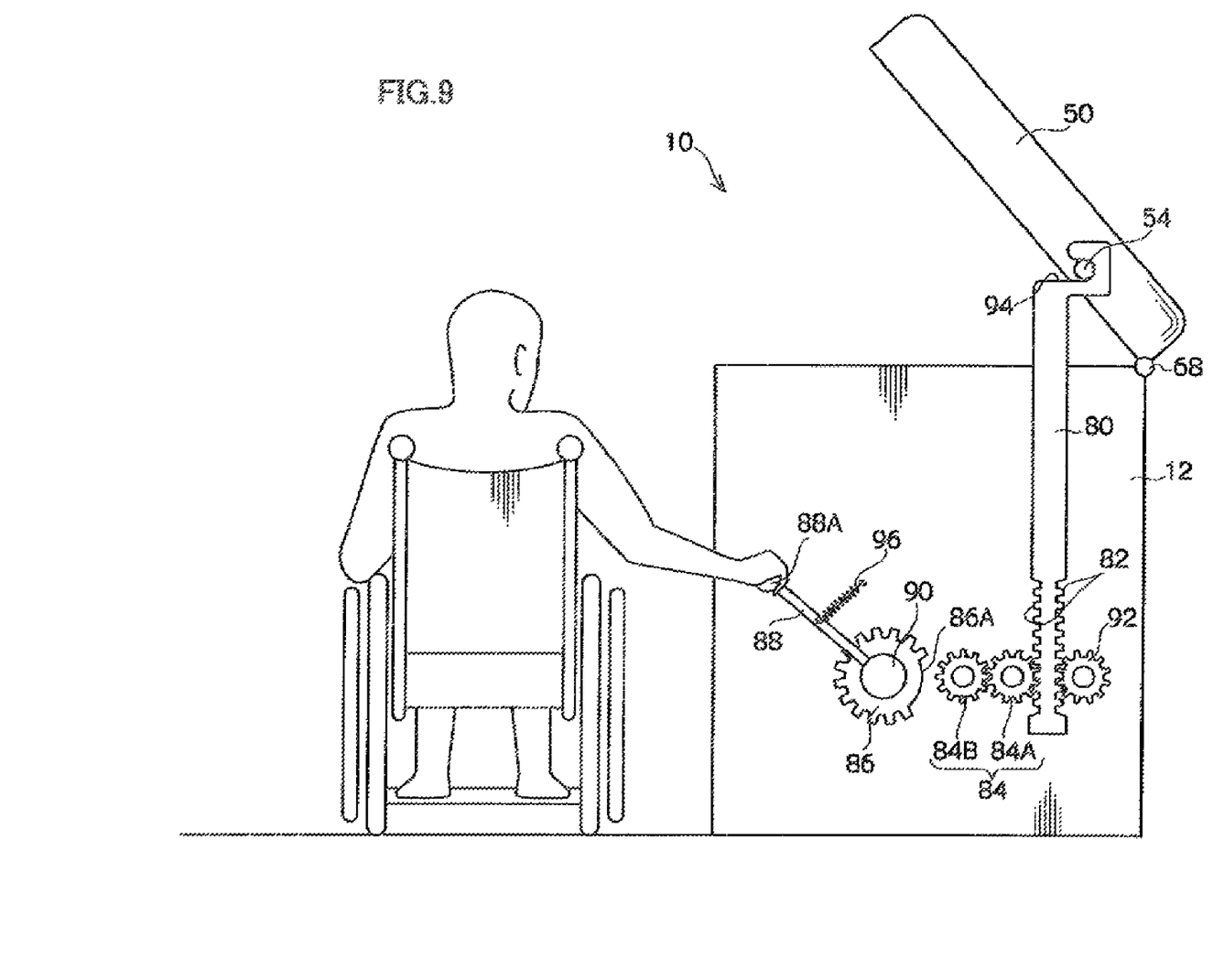
FIG. 9 is a side view showing the image forming device according to the third exemplary embodiment of the present invention in a state where the platen cover is opened.

As shown in FIG. 9, the cylindrical member 54 is pressed upward by the link component 80 and when the platen cover 50 is opened completely, the toothless portion 86A of the ratchet gear 86 faces the second gear 84B, and the gear group 84 is thus in freely rotatable state.

When the gear group 84 becomes in the freely rotatable state, whereby the link component 80 begins to move downward due to the load of the platen cover 50, thus the platen cover 50 begins to close. Here, the damper gear 92 to which rotational resistance force is applied meshes with the rack gear 82 (the rear rack gear). For this reason, the link component 80 moves slowly downward, the platen cover 50 slowly closes and, as shown in FIG. 7, the platen cover 50 can be closed.

Accordingly, a user in a wheelchair grasps the knob 88A of the lever 88 and makes it move back and forth, whereby the user can open the platen cover 50, removes his/her hand from the knob 88A, and place a sheet material P on the platen glass. Further, when closing the platen cover 50, the user makes the lever 88 turn again and the platen cover 50 is opened completely, whereby the toothless portion 86A of the ratchet gear 86 is made to face the second gear 84B and the platen cover 50 can be closed.

Figure 10:
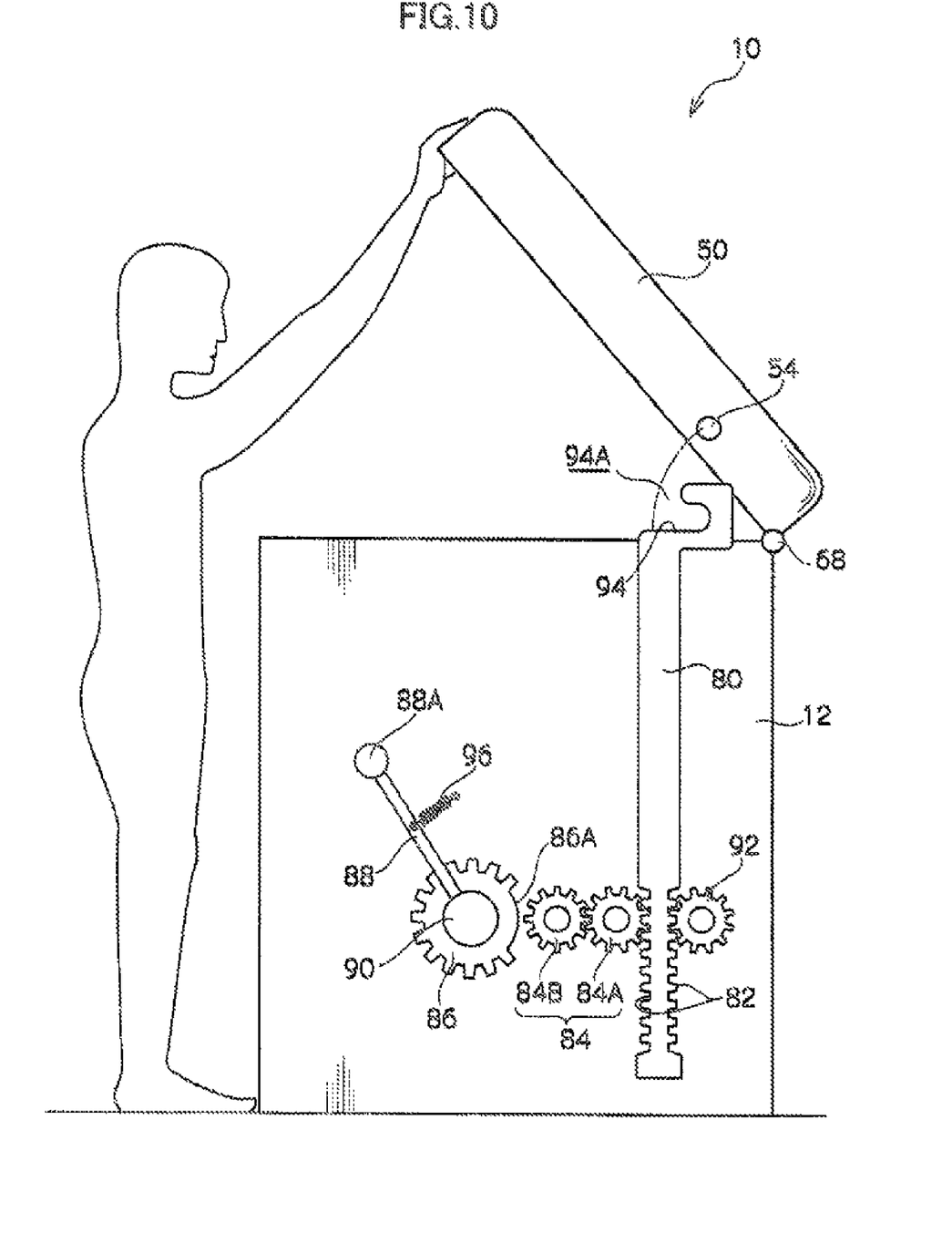
FIG. 10 is a side view showing the image forming device according to the third exemplary embodiment of the present invention in a state where a physically unimpaired person has opened the platen cover.

When a physically unimpaired person opens the platen cover 50, as shown in FIG. 10, he/she approaches the image forming device 10 from the front and grasp the front end portion of the platen cover 50. The user extends his/her hand slantingly upward and opens the platen cover 50.

Here, the opening 94A is formed at the front portion of the U groove 94 so as not to interfere with the cylindrical member 54. The configuration is such that the U groove 94 and the cylindrical member 54 do not latch at the housed position of the link component 80. For this reason, the link component 80 does not move even if the platen cover 50 is opened.

The foregoing description of the exemplary embodiment has been provided for the purposes of illustration and description. It is not intended to be exhaustive or to limit the invention to the precise forms disclosed. Obviously, many modifications and variations will be apparent to practitioners skilled in the art. The exemplary embodiment are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device comprising:
a platen on which a document is placed;
a platen cover that presses and retains the document placed on the platen;
an engagement portion provided at a side surface of the platen cover;
a link component attached to a side surface of a device main body of the image forming device so as to be movable in a substantially vertical direction;
a groove portion provided at an upper end portion of the link component,
that engages with the engagement portion when the link component is moved substantially upward from a housed position thereof, whereby the platen cover opens or closes due to movement of the link component, and
that does not engage with the engagement portion when the link component is at the housed position; and
an operating portion provided to be positioned beneath the platen cover, that is for moving the link component in the substantially vertical direction,
wherein the operating portion comprises:
a lever rotatably attached to the device main body;
a ratchet gear provided at a rotation axis of the lever, that rotates only in a direction in which the platen cover opens and is provided with a toothless portion that has no gear teeth;
a gear group to which rotational force is transmitted from the ratchet gear and which faces the toothless portion of the ratchet gear when the platen cover is at a preset open position; and
a rack gear provided at the link component that meshes with the gear group.

2. The image forming device of claim 1, further comprising a damper gear that meshes with the rack gear and to which rotational resistance force is applied.

3. The image forming device of claim 1, further comprising a one-way clutch provided between the lever and the ratchet gear.

4. The image forming device of claim 1, wherein an open portion is formed at the groove portion, the open portion being opened so as not to interfere with the engagement portion when the link component is at the housed position.

5. The image forming device of claim 1,
wherein teeth of the ratchet gear mesh with teeth of the gear group when the gear group faces a toothed portion of the ratchet gear, and
wherein teeth of the ratchet gear do not mesh with teeth of the gear group when the gear group faces the toothless portion of the ratchet gear.

6. An image forming device comprising:
a platen on which a document is placed;
a platen cover that presses and retains the document placed on the platen;
a pushed portion provided at a side of the platen cover;
a link component at a side of a device main body of the image forming device so as to be movable in a substantially vertical direction, an upper end portion of the link component pushing the pushed portion when the link component is moved substantially upward from a housed position; and
an operating portion provided to he positioned beneath the platen cover, which is for moving the link component in the substantially vertical direction;
wherein the operating portion comprises:
a lever rotatably attached to the device main body;
a ratchet gear provided at a rotation axis of the lever, that rotates only in a direction in which the platen cover opens and is provided with a toothless portion that has no gear teeth;
a gear group to which rotational force is transmitted from the ratchet gear and which faces the toothless portion of the ratchet gear when the platen cover is at a preset open position; and
a rack gear provided at the link component that meshes with the gear group.

7. The image forming device of claim 6, wherein the link component comprises:
a groove portion provided at the upper end portion of the link component, which engages with the pushed portion when the link component is moved substantially upward from the housed position thereof, whereby the platen cover opens or closes due to movement of the link component, and
an open portion formed at the groove portion, the open portion being opened so as not to interfere with the pushed portion when the link component is at the housed position.

* * * * *